No. 784,555. PATENTED MAR. 14, 1905.
J. FOUNTAIN, Jr.
JUNCTION BOX FOR ELECTRICAL CONDUCTORS.
APPLICATION FILED NOV. 13, 1902.
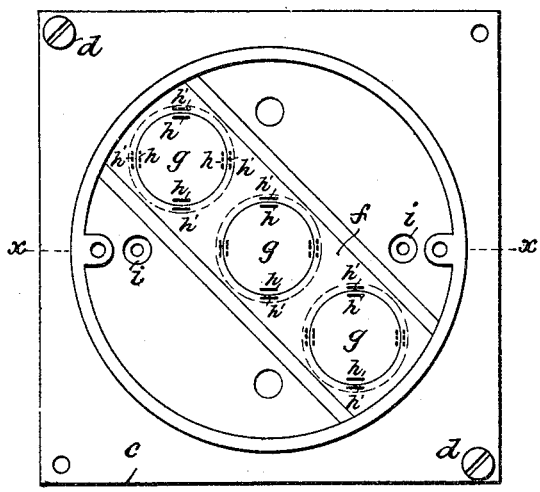
Fig. 1.
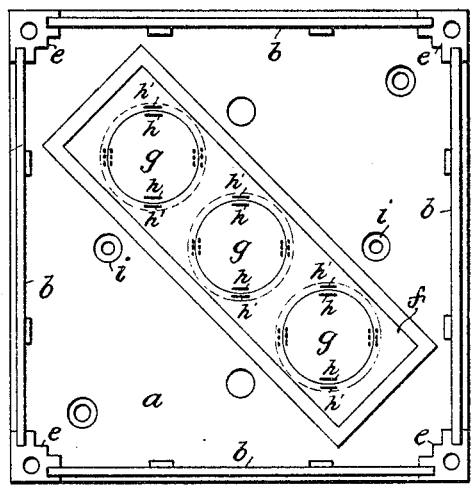
Fig. 2.
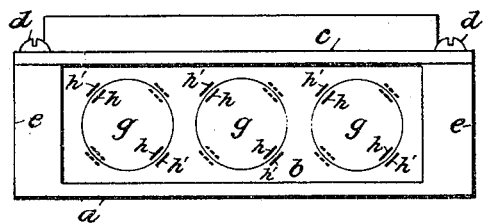
Fig. 3.
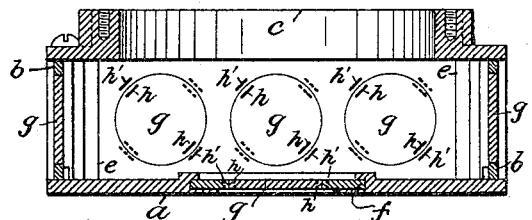
Fig. 4.
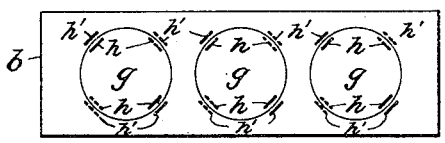
Fig. 6.
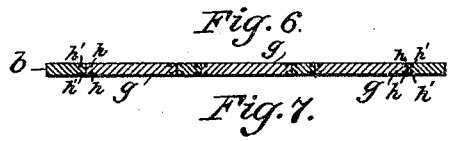
Fig. 7.
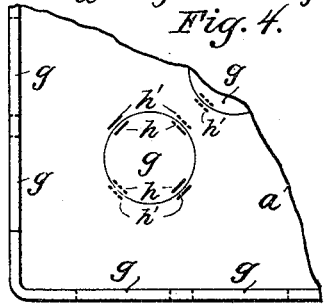
Fig. 5.
WITNESSES:
INVENTOR
ATTORNEY No. 784,555.      Patented March 14, 1905.

UNITED STATES PATENT OFFICE.

JOHN FOUNTAIN, JR., OF ELIZABETH, NEW JERSEY.

JUNCTION-BOX FOR ELECTRICAL CONDUCTORS.

SPECIFICATION forming part of Letters Patent No. 784,555, dated March 14, 1905.

Application filed November 13, 1902. Serial No. 131,092.

*To all whom it may concern:*

Be it known that I, JOHN FOUNTAIN, Jr., a citizen of the United States, residing at Elizabeth, in the county of Union and State of New Jersey, have invented certain new and useful Improvements in Junction-Boxes for Electrical Conductors; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

In modern building construction involving wiring for electric light and other purposes it is important that every precaution be taken to lessen the danger by fire from arcs formed by imperfect insulation and imperfect joints and the like and also to provide for easy accessibility to the wires without necessitating danger to the walls. It has become the usual practice to carry such wires in closed metal pipes or conduits traversing the walls and partitions and to provide junction-boxes secured in the rear to secure the ends of such conduits and allow safe and easy access to the terminals leading therefrom to the fixtures. The conduits running to the junction-box may approach the latter from any or both sides and frequently also from the rear, thus necessitating many forms or patterns of boxes to provide for any varying conditions and entailing much labor and care by the electrical engineer in selecting and properly distributing the boxes.

My invention has for its object to provide a simple, cheap, and efficient junction-box, which is so constructed that it may be adapted for use in connection with any number of inleading conduits and inclosed conductors and will be fully understood by referring to the accompanying drawings, in which—

Figure 1 is a plan view of the box. Fig. 2 is a similar view with the cover removed. Fig. 3 is a side view of the box. Fig. 4 is a vertical cross-section of the box, taken on the line *x x* in Fig. 1. Fig. 5 is a plan view of a part of a sheet-metal drawn box, representing the plates in position. Fig. 6 is a side view of the plate or side of the box with the disks forced back into position, and Fig. 7 is a sectional view of the same.

In the wiring of buildings by electrical illumination, transmissions of power, &c., there are many conditions which necessitate the use of individual junction-boxes constructed especially for such individual uses.

My invention contemplates the construction by casting or otherwise of a junction-box in such a manner that the box may be adapted to the peculiar conditions arising—that is to say, if there is to be one, two, or any number of inleading conduits or pipes my improved junction-box is so constructed that it may be adapted therefor and put in place by the workmen as the conditions arise, and it comprises a skeleton frame of cast metal and having its sides made of sheet metal secured in position to uprights of the base of said skeleton frame by simply inserting the same in the uprights, or they may be secured thereto during the process by casting the skeleton frame, or the box may be a drawn sheet-metal box. The sheet-metal sides of the boxes are provided with a hole or holes by having a portion punched out from said side in the form of a plate or disk and then again forcing said plate or disk into the opening in the side by crowding the metal of both the side and the disk toward each other, so as to hold the disk until driven out or removed by the workmen. Boxes of this kind are supposed to be sent out on the market with all the holes for the conduits stopped by the plates which have been punched out of the respective holes and forced back into the holes and practically forming a box without any conduit-opening. It has been generally found that boxes of this kind after having been sent out on the market were received with holes from which the plates have been accidentally displaced through shipping and extensive handling. It has therefore been found necessary to provide more positive means whereby the plates could be positively (and permanently, if necessary) held in position until removed by workmen. This I accomplish by forming indentations in both the plate and box, whereby the metal of the plate is crowded outward and the metal of the box inward and the plate adapted to be removed to clear the openings for the conduits by being forced inwardly and outwardly.

Similar letters of reference indicate like parts.

Referring now to the drawings in detail, $a$ represents the base of my novel junction-box, which is made of cast-iron and in which the sides $b$ are formed of sheet metal, preferably cast in position.

$c$ represents the cover of the junction-box, which is secured to the base by two screws $d$, that pass through perforations in the cover and screw into threaded uprights or posts $e$, formed integral with the base.

The side plates $b$ and the bottom plate $f$ are provided with numerous holes or openings suitably located and stopped by the same blank or disk $g$ which is punched out to form the hole being driven or forced back therein. The disk $g$ when forced back to plug the holes has a series of indentations $h$ near its circumferential edge formed by a die, which in forming the indentations will force the edges of the disk out toward the periphery, so as to firmly lock the plate or disk in place. The die which forms the indentations $h$ in the plate or disk $g$ simultaneously forms corresponding indentations $h'$ in the side plate of the box or in the box itself, as in the case of a sheet-metal box, directly opposite to those formed in the disk $g$. The forming of the indentations $h$ and $h'$ in the disk and sides being accomplished by a double die, it will be readily understood that similar indentations are formed on the opposite sides of the disks and sides, so as to provide additional crowding metal, which serves to securely lock the disk in position against any possible displacement unless forcibly driven from its position by the workman when he desires to apply a fixture. These plates or disks $g$ are securely held in their positions in the holes or openings in the sides or bottom of the junction-box to close the said holes or openings and can only be removed by a hard tap from a hammer or other tool when the workman desires to apply a fixture to the same.

These boxes are sent out on the market with all or nearly all of the holes for the conduits stopped by the disks $g$, which have been punched out of the respective holes and forced back into the holes and practically forming a box without any conduit-openings. In the use of these boxes the conduits are liable to come to the box from the top or sides or bottom, and when the box is brought to the place where it is employed the plates $g$ in the openings which are to be used for the entrance of the end of the conduit are removed by being forced inwardly or outwardly, as circumstances may permit, while the others remain in place to complete the sides or bottom of the box. The bottom part of the junction-box is provided with suitably-placed screw-holes $i$ for securing the box-section in position in the wall, ceiling, or other part of the building.

I am aware that changes may be made in the various arrangements and combinations of the parts without departing from the scope of my invention. Hence I do not limit my invention to the exact arrangement and combination of the parts as described, nor do I confine myself to the exact shape and configuration of the box.

Having now described my invention, what I claim is—

1. A junction-box having an opening therein, a removable plate secured in said opening by means of adjacent indentations respectively formed in box and plate at different points around the opening and on opposite sides of the box and plate.

2. A junction-box having an opening therein, a removable plate secured in said opening by means of adjacent indentations respectively formed in box and plate at different points around the opening and on opposite sides of the box and plate, the indentations on each side being diametrically disposed with reference to each other, and the indentations on one side being arranged at substantially right angles to those on the other side of the box and plate.

This specification signed and witnessed this 12th day of November, 1902.

JOHN FOUNTAIN, Jr.

Witnesses:
    FREDK. C. FISCHER.
    HUGO BOEPPLE, Jr.